United States Patent [19]
Wood

[11] Patent Number: 5,999,323
[45] Date of Patent: *Dec. 7, 1999

[54] ACTIVE SOLAR REFLECTOR

[76] Inventor: Charles F. Wood, 8652 W. Donald Dr., Peoria, Ariz. 85382

[*] Notice: This patent issued on a continued prosecution application filed under 37 CFR 1.53(d), and is subject to the twenty year patent term provisions of 35 U.S.C. 154(a)(2).

[21] Appl. No.: 08/870,959

[22] Filed: Jun. 6, 1997

Related U.S. Application Data

[60] Provisional application No. 60/019,317, Jun. 7, 1996.

[51] Int. Cl.$^6$ ............................. G02B 17/00; G02B 27/00
[52] U.S. Cl. .......................... 359/591; 359/596; 359/597
[58] Field of Search ................................... 359/591, 592, 359/594, 597, 596

[56] References Cited

U.S. PATENT DOCUMENTS

| | | | |
|---|---|---|---|
| D. 362,081 | 9/1995 | Bilbrey | D26/120 |
| 721,258 | 2/1903 | Wadsworth | 359/592 |
| 4,128,307 | 12/1978 | Badertscher et al. | 350/263 |
| 4,304,218 | 12/1981 | Karlsson | 126/419 |
| 4,883,340 | 11/1989 | Dominguez | 350/260 |
| 4,943,141 | 7/1990 | Mori | 350/258 |
| 4,968,355 | 11/1990 | Johnson | 136/246 |
| 5,088,543 | 2/1992 | Bilbrey | 160/310 |
| 5,204,777 | 4/1993 | Curshod | 359/596 |
| 5,729,387 | 3/1998 | Takahashi et al. | 359/591 |

OTHER PUBLICATIONS

Advertisement: "Simply Brilliant! Solartube" of *The Arizona Republic* newspaper, May 22, 1996 (1 page).
Brochure: "Under–the–Dome UTD–2000 Active Daylighting System" by Natural Lighting Co. Inc., 1995 (4 pages).

*Primary Examiner*—Safet Metjahic
*Assistant Examiner*—Christopher E. Mahoney
*Attorney, Agent, or Firm*—Cahill, Sutton & Thomas P.L.C.

[57] ABSTRACT

An active solar reflector, preferably mounted within a transparent dome, tracks the sun from sunrise to sunset to reflect impinging solar radiation into a room or other space to be lighted. The reflector includes a plurality of angled mirrors mounted one behind the other and of progressively increasing heights to intercept and reflect as large a flat plate area of solar radiation as possible. The mirrors are mounted upon a support rotatable about an axis to track the sun and to have the mirrors continuously reflect the impinging solar radiation.

6 Claims, 6 Drawing Sheets

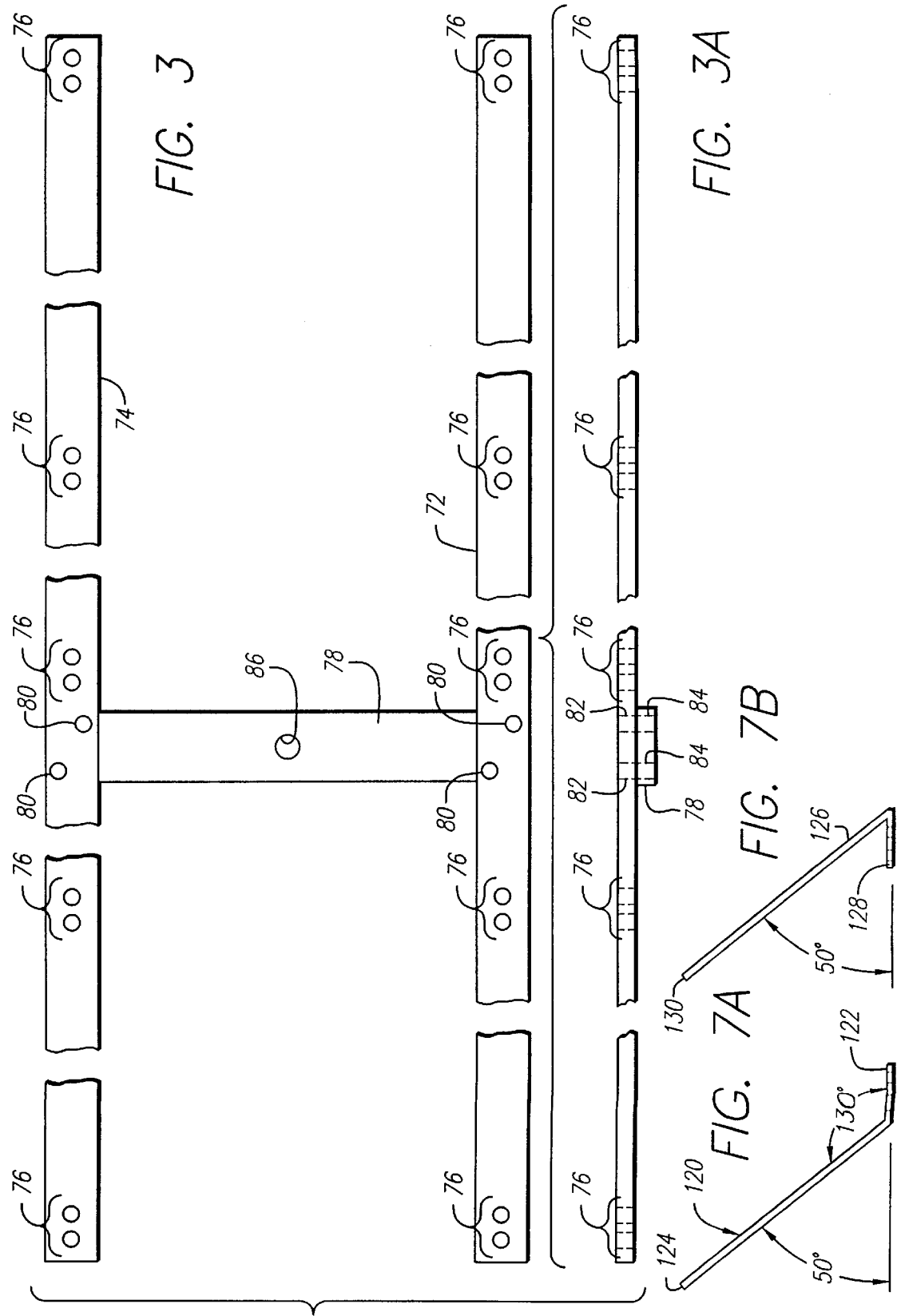

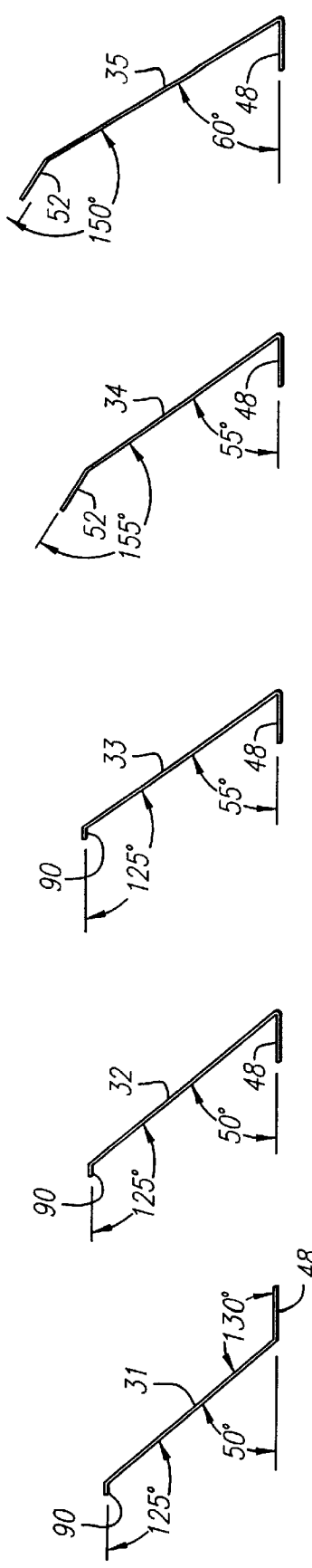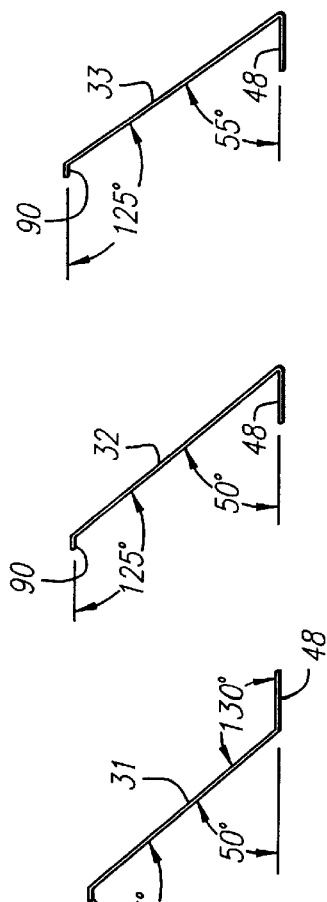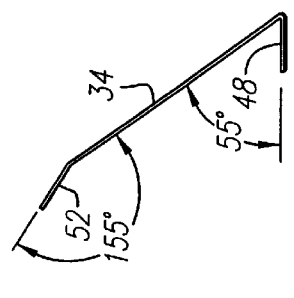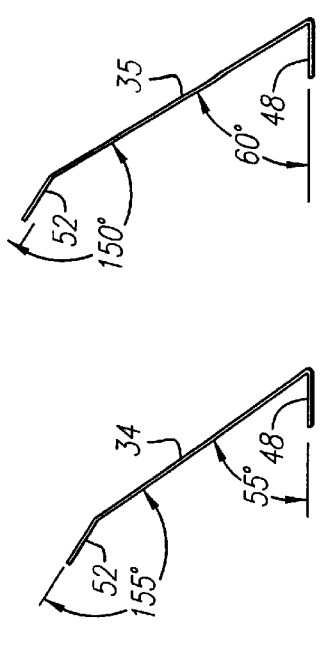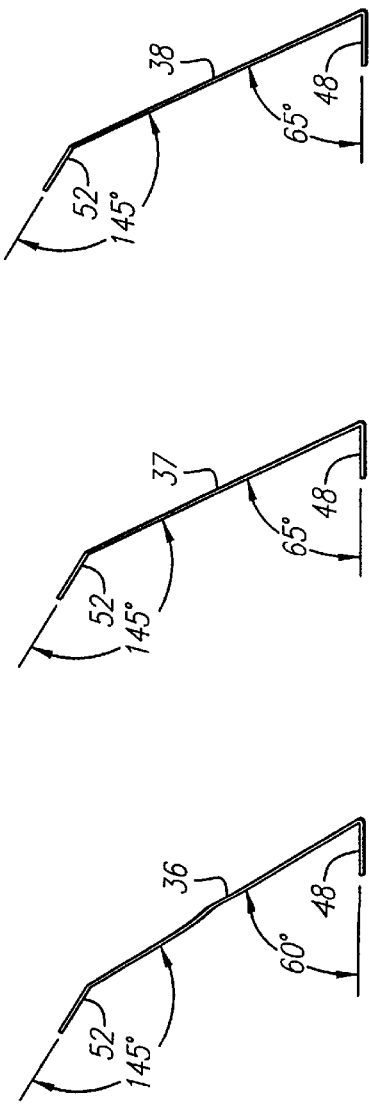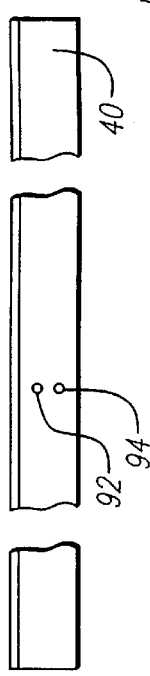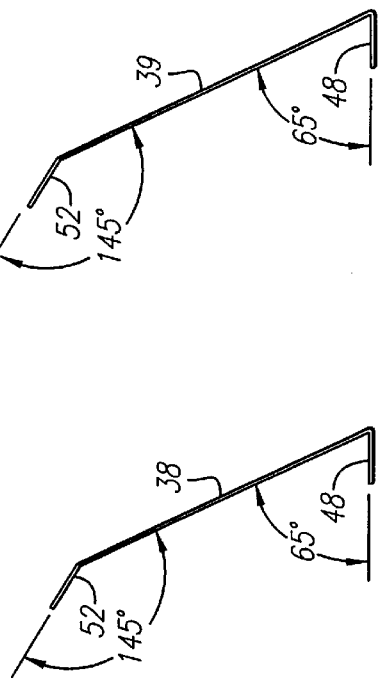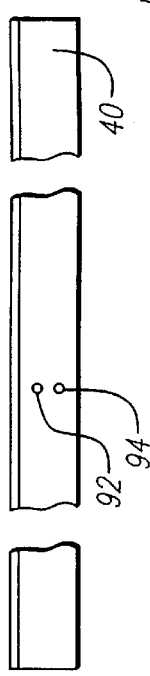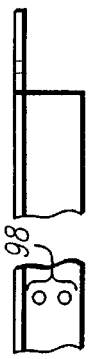

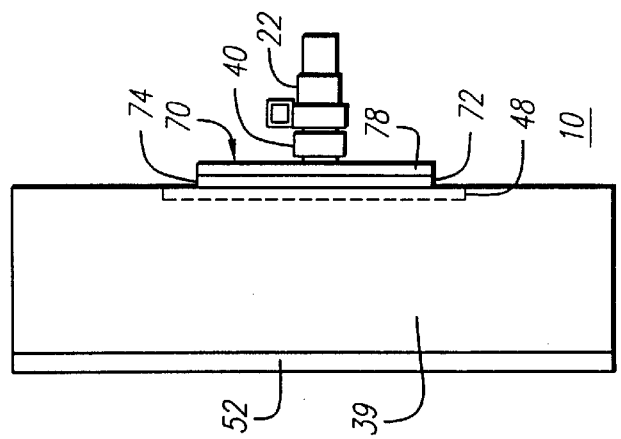
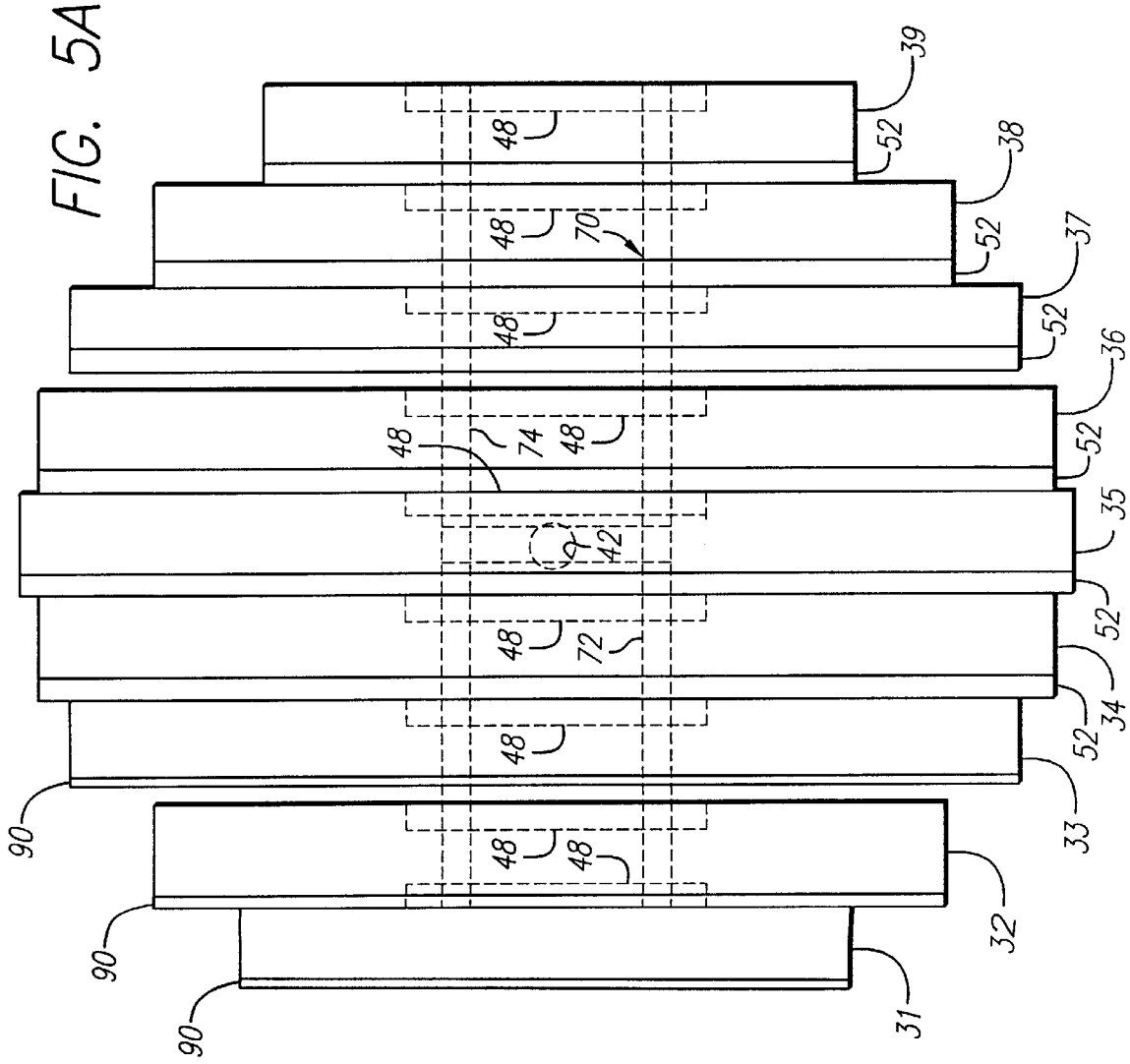

ACTIVE SOLAR REFLECTOR

CROSS-REFERENCE TO RELATED APPLICATION

The present application includes subject matter disclosed in and claims priority to a provisional application entitled "SOLAR COLLECTION APPARATUS", assigned Ser. No. 60/019,317, filed Jun. 7, 1996.

BACKGROUND OF THE INVENTION

1. Field of the Invention

The present invention relates to solar reflectors and, more particularly, to an active solar reflector having angled mirrors of progressively increasing heights rotatably mounted to track the sun and continuously reflect as much impinging solar radiation as possible during the early and late hours of the day.

2. Description of Related Art

Interior rooms and other spaces within buildings have been naturally lighted through use of transparent or translucent roof mounted skylights or domes. These domes permit solar radiation to be transmitted directly through a shaft into the space of interest. During a time period after sunrise and during a similar period before sunset, the angle of inclination of the sun is relatively low and little light shines through the dome into the space to be lighted. At noon, the sun is at its highest point and solar radiation through the dome is at a maximum. As a result, the amount of light contributing to lighting of the space of interest is represented by a bell-shaped curve having an ordinate in time and an abscissa in light radiation. Such extensive differences of natural light during the day continually alters the color perception within the space of interest to a significant degree. To maintain an adequate level of light necessary, artificial light must be used during a significant part of the day and may be left on all day due to inattention or laziness resulting in unnecessary consumption of energy and added expense.

SUMMARY OF THE INVENTION

To enhance transmission of solar radiation through a transparent skylight or dome into a space to be lighted, a plurality of angled mirrors are mounted from front to rear upon a bar or other support. The angle of the mirrors is set to reflect impinging solar radiation shortly after sunrise and shortly before sunset into the space of interest and thereby significantly increase the light in the space during the early and late hours of the day. An angled lip disposed along the upper edge of one or more of the mirrors, in combination with the mirrors being of progressively greater height from front to back, enhances the light reflection when the sun is low on the horizon.

A motor assembly rotates the mirror supporting bar to track the sun and thereby maintain the plurality of mirrors transverse to the impinging solar radiation. When the sun is high in the sky, the angled mirrors may impede direct light transmission into the space and such impediment is of direct benefit by maintaining more uniform the level of lighting of the space of interest by the sun.

It is therefore a primary object of the present invention to provide a solar reflector for reflecting solar radiation into a space of interest during the whole time period between sunrise and sunset.

Another object of the present invention is to provide a solar reflector having a plurality of angled mirrors of progressively greater heights to capture as much solar radiation as possible during low angles of inclination of the sun.

Still another object of the present invention is to provide a multi-mirrored solar reflector that tracks the sun to maximize the amount of solar radiation reflected into a space of interest.

Yet another object of the present invention is to provide a multi-mirrored solar reflector for reflecting a reasonably uniform amount of solar radiation into a space of interest during daylight hours.

A further object of the present invention is to provide a solar reflector for illuminating an interior space directly or through a light shaft.

A still further object of the present invention is to provide a solar reflector having a plurality of angled double mirrored surfaces for reflecting impinging solar radiation into a space to be lighted.

A yet further object of the present invention is to provide a method for reflecting solar radiation into a space to be lighted.

A yet further object of the present invention is to provide a protected environment for a solar reflector without materially impeding solar irradiation.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 3 illustrates an alternate bar assembly for supporting the mirrors and

FIG. 3A is a side view of the alternate bar assembly;

FIGS. 4A–4I illustrate cross-sections of the various mirrors for the reflector shown in FIGS. 1 and 2 and FIGS. 4J and 4K illustrate representative alternative bases for each of the mirrors;

FIG. 5A is a top view illustrating the planform of the locations for the mirror of the solar reflector and FIG. 5B is an end view showing the rearmost mirror of the reflector;

FIGS. 7A and 7B illustrate cross-sections of alternative configuration mirrors for the reflector shown in either FIG. 2 or FIG. 6.

DETAILED DESCRIPTION OF THE PREFERRED EMBODIMENT

Figure 1:
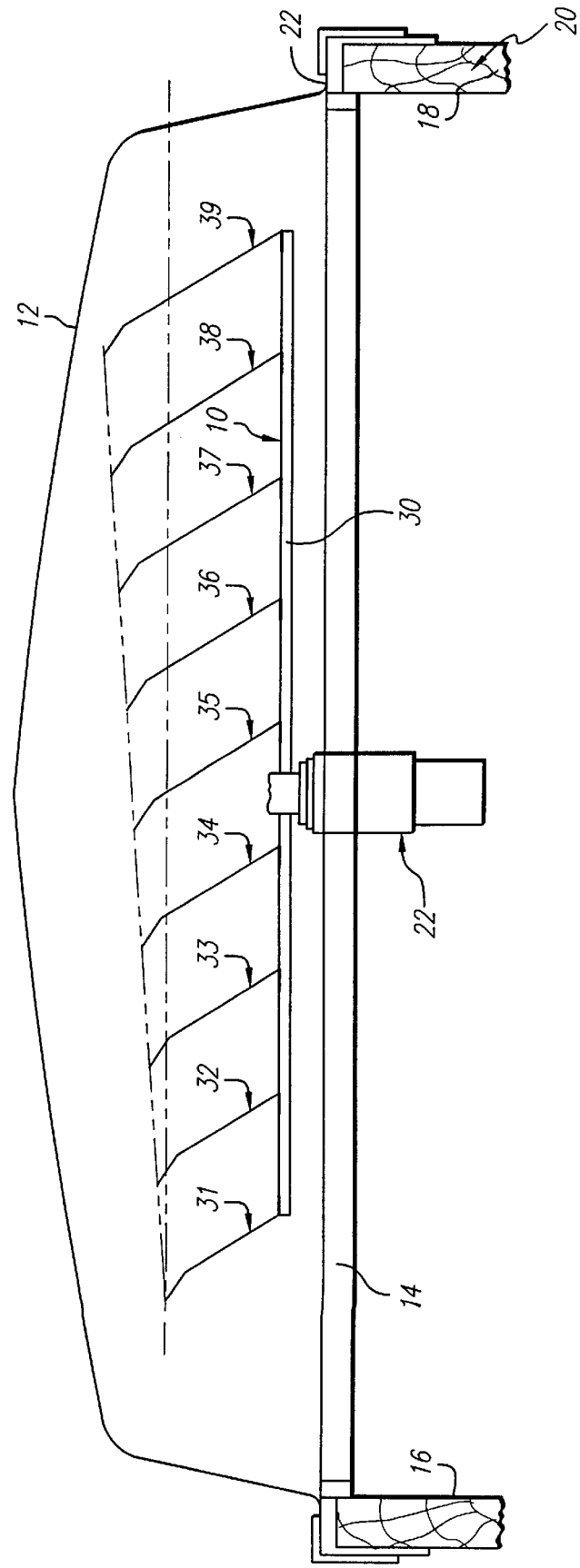
FIG. 1 illustrates a side view of an active solar reflector mounted within a solar radiation transparent dome.

FIG. 1 illustrates a side view of a solar reflector 10 rotatably mounted beneath and within a solar radiation transmissive skylight or dome 12. Preferably, the solar reflector is sufficiently displaced from or raised above any surrounding non-light-transmissive structure to permit irradiation with solar energy shortly after sunrise and just before sunset. A mounting bracket 14 is secured to opposed sides 16,18 of a conventional framework 20 for a skylight; this framework is sometimes referred to as a skylight curb. Framework 20 may provide a direct opening to a space of interest to be illuminated by solar radiation or it may be the upper end of a light shaft in communication with the space of interest to be illuminated by solar radiation.

The mounting bracket supports a drive motor assembly 22 for rotating solar reflector 10 to track the movement of the sun from sunrise to sunset. Mechanisms of this type are readily commercially available and one such supplier is Power Management Systems, Inc. of Phoenix, Ariz. Dome 12, forming a conventional skylight, is mounted upon and secured to the skylight curb or framework 20. A peripheral flange 24 extending about the dome may be used for purposes of mounting the dome and securing it in place.

Solar reflector 10 includes a mounting bar 30 for mounting each of a plurality of angled mirrored surfaces, hereinafter referred to as mirrors 31 to 39. The heights of these mirrors progressively increase from front to rear at an angle in the range of about five degrees (5°) to about twenty degrees (20°). Drive motor assembly 22 maintains the front or first mirror 31 closest and transverse to the sun. The progressively increasing height of the mirrors toward the rear permits reflection of significant additional radiation at the low sun angles present close to sunrise and sunset. That is, the progressively increasing heights of the mirrors will intercept and reflect as large a flat plate area of solar radiation as possible. Without such height increase of the mirrors, the amount of reflected radiation would be significantly reduced.

Figure 2:
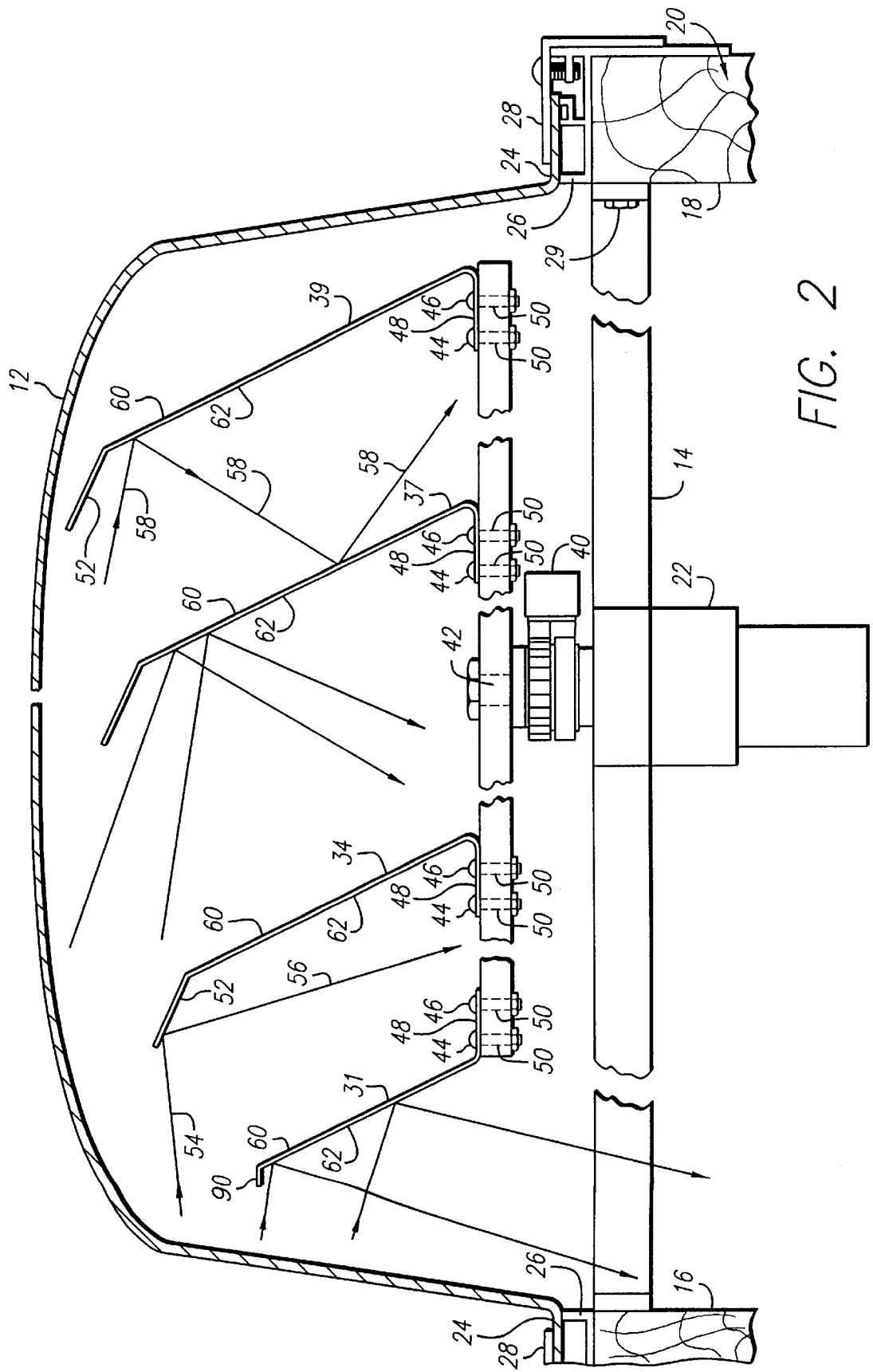
FIG. 2 illustrates details of the solar reflector shown in FIG. 1.

Referring to FIG. 2, further details attendant the assembly shown in FIG. 1 will be described. Peripheral flange 24 of dome 12 rests upon a skylight frame 26 and is retained in place by a retainer 28 capturing the flange against the skylight frame. The skylight frame, in turn, is secured to framework 20, which framework defines, the passageway through which the sunlight is to be reflected. Mounting bracket 14 is secured to framework 20 by wood screws 29 if framework 20 is wooden or other suitable attachment mechanisms commensurate with the structure of the framework. Drive motor assembly 22 may include a stepper mechanism 40 for incrementally rotating mounting bar 30 to have the solar reflector track the sun. Mounting bar 30 may be a single bar secured to shaft 42 extending from the drive motor assembly. A plurality of mirrors 31–39 are mounted upon mounting bar 30 in generally parallel relationship to one another and transversely to the major axis of the mounting bar. To prevent movement of each mirror, a pair of nut and bolt mechanisms 44,46 extend through commensurate holes in base 48 of each mirror and through appropriately spaced holes 50 in mounting bar 30.

Each mirror extends, upwardly from its base 48 to define an acute angle with a plane passing through the base in the range of about 50° to about 65°; however, these angles may be modified ±20° as a function of the latitude of the location of the installation and hence a function of the maximum and minimum angle of inclination of the sun at its highest point. Certain of the mirrors, such as mirror 34, includes not only a base 48 extending along its bottom edge, but also a lip 52 extending along its top edge. The purpose of lip 52 is two-fold. First, it intercepts solar radiation when the sun is close to the horizon and it reflects the sunlight downwardly at an angle close to vertical, depending, of course, upon the angle of the incidence of the solar radiation; note the incident and reflected light rays 54,56. Second, the lip adds to the rigidity of the respective mirror. Depending upon the height of the sun and the angle of the mirrors, reflected right rays may impinge upon the backside of a mirror, as depicted by light ray 58. To minimize loss of light intensity, each of the mirrors may include a mirrored surface on both sides, as represented by numerals 60,62. A reduced width lip 90, shown in combination with mirror 31, may be incorporated for the primary purpose of increasing the rigidity of the mirror.

As described above, the mounting bar 30 may be a single bar secured to the approximate midpoint of each mirror. Referring to FIG. 3, there is shown an alternate mounting bar assembly 70. This bar includes a pair of rails 72,74 for supporting each of the mirrors at two spaced apart locations. A pair of holes 76 may be formed in each of the rails at the appropriate locations, as depicted. A cross-member 78 interconnects rails 72,74. This cross-member may be secured to the underside of each of the rails, as depicted in FIG. 3A by bolts 80 extending through holes 82 in each of the rails and engaging threaded holes 84 in the cross-member. The center of cross-member 78 includes a hole 86 for penetrable engagement with shaft 42 of drive motor assembly 22 to bring about incremental rotation of the mounting bar assembly. Because mounting bar assembly 70 provides two points of attachment for each of the mirrors, the resulting structure may be more robust than the single mounting bar and have the benefit of accommodating use of lighter weight or smaller dimensioned components.

Referring jointly to FIGS. 4A–4I, there are illustrated representative configurations of mirrors located from the front to the rear of solar reflector 10. The frontmost mirror 31, depicted in FIG. 4A, may include a base 48 extending away from the mirror at an obtuse angle of about 130°. A narrow lip 90 may be formed to extend forwardly at an angle of approximately 125° primarily for the purpose of rendering the mirror more rigid. A secondmost or subsequent. mirror 32, shown in FIG. 4B, represents a mirror having a base 48 extending toward the mirror at an acute angle of about 50°. A narrow lip 90 may be incorporated primarily for purposes of rigidity of the mirror. Mirror 33, shown in FIG. 4C, may be similar to mirror 32 except that the angle defined by the base is about 55°. A mirror 34 shown in FIG. 4D and located just forwardly of shaft 42 includes a lip 52 set at an angle of about 155° with the mirror. The angle between base 48 and the mirror is about 55°. Lip 52 may be more wide than lip 90, which width, in combination with its angular orientation, serves as a light reflecting surface and also adds rigidity to the respective mirror. A mirror 36 located proximate shaft 42 and essentially at the midpoint of the reflector defines an angle with its base 48 of about 60°. This mirror may include a lip 52 set at an obtuse angle of about 150°, as shown. As shown in FIGS. 4F, 4G, 4H, and 4I, further rearwardly located mirrors define an angle with their respective bases 48 of about 65° (except for mirror 35 which has an angle of about 60°) and the angle defined by respective lips 52 is about 145°.

The height of each of mirrors 31–39 is progressively greater such that the height of each mirror from its base to the top of the mirror, whether or not the mirror includes a lip, is progressively increased. Preferably, the rate of increased height should be such that a line passing along the tops of the mirrors from front to rear defines an angle in the range of 5°–20° with a similar line passing through the bases of the mirrors. With such increasing height, as depicted in FIG. 1, each of the mirrors of reflector 10 is capable of receiving impinging solar radiation and reflect the received solar radiation into the space of interest during the early and late hours of the day when the sun is low on the horizon.

FIG. 4J is a top view of a representative base 48 of a mirror and showing holes 92,94 for engagement by nut and bolt mechanisms 44,46 (see FIG. 2) or other attachment means, such as rivets. Other mechanical or chemical attachment means, such as mechanical interlocks or adhesives, may be deployed to secure the respective mirrors to the mounting bar at the appropriate locations.

FIG. 4K is a top view of a representative base 48 of a mirror showing pairs of holes 96,98 for attaching the mirror to the pair of rails 72,74 of mounting bar assembly 70. Attachment means, such as nuts and bolts, rivets, etc. may be used to penetrably engage the respective aligned holes upon assembly of the mirrors on the mounting bar assembly. Other attachment means may also be used. In this configuration, the length of the base may be less than the width of the mirror, unless the full length of the base is needed for purposes of structural rigidity.

Referring to FIG. 5A, there is shown a top view of mirrors 31–39 mounted upon mounting bar assembly 70 (shown in dashed lines). Base 48 of each of the mirrors is attached to rails 72,74 of the mounting bar assembly, as discussed above. Each of the bases terminates short of the corresponding ends of the respective mirror for the purpose of reducing the surface area of structure that would impede downward transmission of reflected solar radiation. Note also the termination of the base as depicted in FIG. 4K. By employing narrow width lips 90 with each of mirrors 31, 32, and 33 and the wider lips 52 with each of mirrors 34, 35, 36, 37, 38, and 39, sufficient structural rigidity is present to retain the orientation and correct reflection angles of the respective mirror surfaces present upon each mirror. It is to be noted that while lips 90 are primarily employed for purposes of rigidity, they could be angularly oriented and rendered wider to provide more light gathering and reflection capability. The lengths of mirrors 31–39 varies as a function of their respective locations upon the mounting bar assembly. As illustrated, the plan form of the combination of these mirrors approximates a circle. Such configuration is particularly useful as the reflector rotates about shaft 42 of the drive motor assembly. Thus, the enclosing skylight or dome may be circular or rectangular provided that the dimensions thereof are adequate to permit rotation of the solar reflector.

FIG. 5B illustrates an end view of reflector 10 but depicting only mirror 39. It shows clearly the full width of lip 52 and it shows that base 48 may extend for less than the full width. It is to be understood that base 48 may extend for the full width of mirror 39 if required for rigidity purposes, and depending upon the type and nature of materials along with the thickness thereof from which mirror 39 is manufactured.

Figure 6:
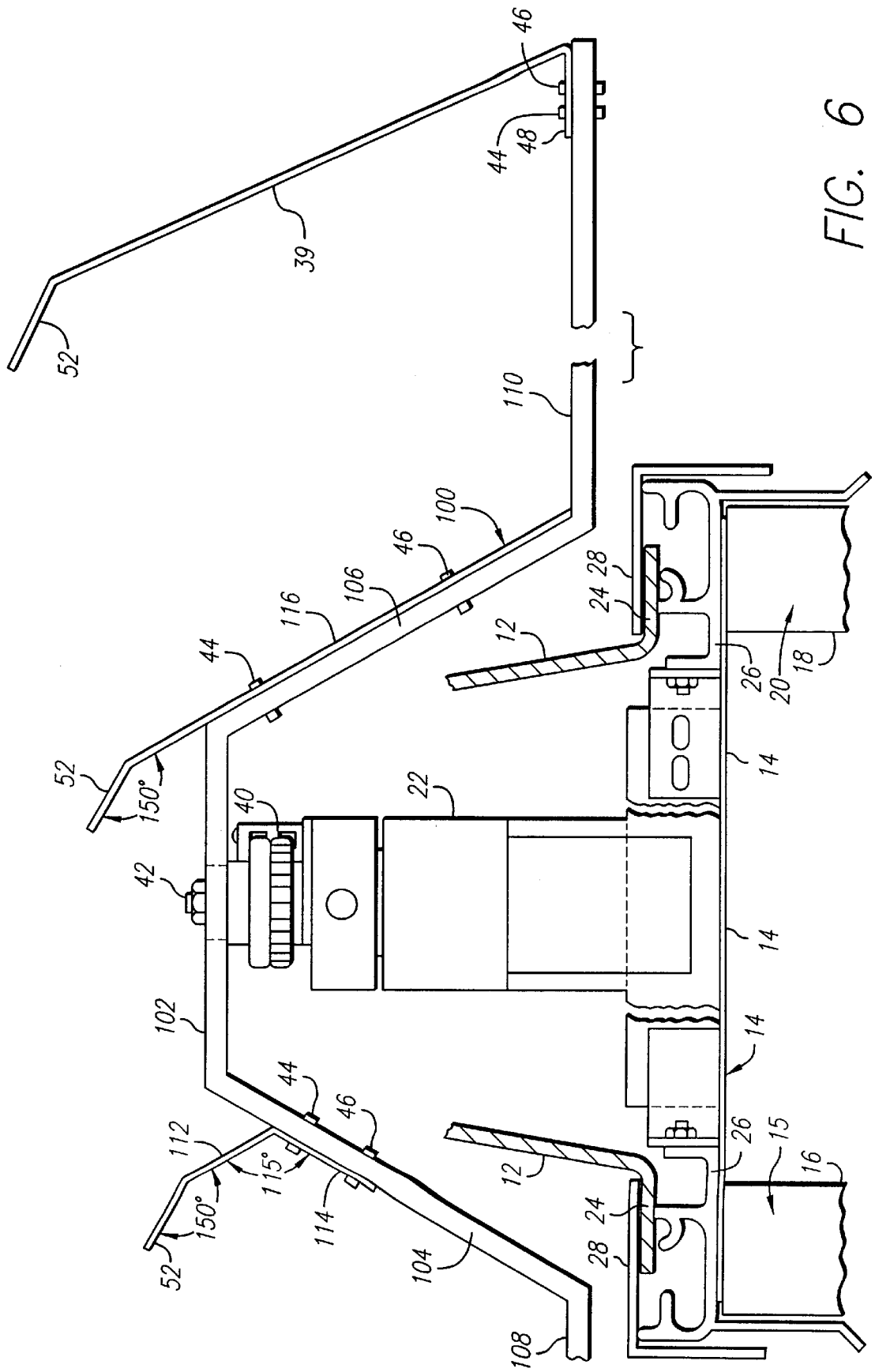
FIG. 6 illustrates a solar reflector having a hat-shaped supporting bar assembly to accommodate mounting of a drive assembly.

Referring to FIG. 6, there is shown a hat-shaped mounting bar 100 for supporting each of the multiple mirrors. This hat-shaped section may be required if drive motor assembly 22 has to be mounted upon a mounting bracket 14 extending from framework 20. By employing a hat-shaped mounting bar 100, a dome 12 of conventional height may be used. It is to be understood that the portions of framework 24, skylight frame 26, retainer 28 and dome 12, are shown as being below the hat-shaped section of bar 100. This is not correct as these elements are in fact lateral of bar 100 (as shown in FIGS. 1 and 2). The present location of these illustrations in FIG. 6 is for purposes of conservation of space in the drawing.

The hat-shaped mounting bar includes a center section 102 penetrably mounted upon and secured to shaft 42 of drive motor assembly 22. A pair of downwardly sloping sections 104,106 extend from the respective extremities of center section 100. Extensions 108,110 extend from respective sloping sections 104,106. The respective mirrors, discussed above with respect to mounting bar 30, are mounted upon respective ones of extensions 108,110 of hat-shaped mounting bar 100.

To ensure maximum reflective capability, a modified mirror 112 is mounted upon sloping section 104. This mirror includes a base 114 attached by nut and bolt mechanisms 44,46 or the like, to the sloping section. Mirror 112 extends upwardly from base 114 at an obtuse angle of approximately 115°. A lip 52 may be incorporated to extend from mirror 112 at an obtuse angle of approximately 150° to reflect incidental solar radiation essentially downwardly; it also adds to the rigidity of the mirror. A further mirror 116 is attached to sloping section 106 by nut and bolt mechanisms 44,46 or the like. Mirror 116 may include a lip 52 extending from the mirror at an angle of about 150° to reflect incident solar radiation essentially downwardly; this lip also adds to the rigidity of mirror 116. The angular orientation of mirror 116 is a function of the slope angle of sloping section 106, which can be made to essentially correspond with that of the remaining mounted mirrors. The top view of the reflector depicted in FIG. 6 is commensurate with that shown in FIG. 5A, except to the extent the centrally located mirrors are modified.

By using a hat-shaped mounting bar 110 at locations wherein drive motor assembly 22 cannot be dependingly supported by mounting bracket 14, a conventionally sized and configured dome may still be used. Furthermore, the mounting of the mirrors upon each of the sloping sections of the hat-shaped mounting bar will provide essentially the same amount of solar radiation reflecting area as the configuration of the invention depicted in FIGS. 1, 2, and 5A. It is to be understood that the single hat-shaped bar may be replaced by an assembly of a pair of hat-shaped bars interconnected with a cross-member and mounted upon shaft 42 similar to mounting bar assembly 70 in construction and operation.

FIGS. 7A and 7B depict somewhat modified versions possible for one or more of mirrors 31–39. In FIG. 7A, there is shown a mirror 120 extending upwardly from a base 122 at an obtuse angle of approximately 130°. Upper edge 124 does not include a lip or other extension. FIG. 7B shows a further mirror 126 extending upwardly from a base 128 at an acute angle of approximately 50°. Edge 130 defines the upper terminal extremity of mirror 126 without incorporating a lip or other departure from the planar surface defined by the mirror. To obtain the requisite rigidity of mirrors 120,126, their respective bases, 122,128, may extend for the full width. Furthermore, the characteristics of the material of the mirrors would dictate the dimensions necessary to obtain the requisite degree of rigidity and structural strength. Mirrors of this type, without angled lips, may be particularly useful when reflection of solar radiation at a greater than a minimum angle of incidence is of importance and where the shading that would be provided by the lips at high angles of incidence is to be avoided. Reflection of solar radiation at low angles of incidence but greater than the predetermined minimal angle can be accomplished by increasing the height of the mirrors progressively from front. to rear of the reflector. It is to be understood that mirrors 120,126 may be used with either a single mounting bar 30 or with a mounting bar assembly discussed above.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. An active solar reflector disposed within a solar radiation transmissive dome for reflecting solar radiation into a space within a building, said reflector comprising in combination:

(a) a motor assembly having a shaft for rotating said solar reflector to track the sun;
   (b) a mounting bracket disposed beneath the dome for supporting said motor assembly;
   (c) a bar adapted to rotate in response to rotation of a shaft of said motor assembly;
   (d) a pair of rails having midpoints attached to and extending transversely from said bar;
   (e) a plurality of mirrors mounted upon said pair of rails at an angle to reflect solar radiation transmitted through the dome into the space, each mirror of said plurality of mirrors having a longitudinal length and a lateral width, each mirror of said plurality of mirrors having a progressively increased width from the front mirror to the rear mirror; and
   (f) each mirror of said plurality of mirrors including a forwardly bent lip extending along its upper longitudinal edge for reflecting impinging solar radiation downwardly toward the space.

2. The active solar reflector as set forth in claim 1 wherein both sides of each of said plurality of mirrors include mirrored surfaces.

3. The active solar reflector as set forth in claim 1 wherein each mirror of said plurality of mirrors located forwardly and rearwardly of the shaft of said motor assembly is of a progressively reduced length.

4. The active solar reflector as set forth in claim 1 wherein the progressively increased width of said plurality of mirrors defines an angle in the range of 5° to 20°.

5. The active solar reflector as set forth in claim 1 wherein said bar comprises a center section, two sloping sections extending from opposed edges of said center section and an extension extending from each of said sloping sections.

6. The active solar reflector as set forth in claim 5 wherein said plurality of mirrors includes a mirror mounted on each of said sloping sections.

* * * * *